United States Patent [19]

Suzuki

[11] Patent Number: 5,333,370
[45] Date of Patent: Aug. 2, 1994

[54] AUTOMATIC CONTROL SYSTEM OF A NUMERICAL CONTROL ROUTER

[75] Inventor: Yukitomo Suzuki, Shizuoka, Japan

[73] Assignee: Heian Corporation, Shizuoka, Japan

[21] Appl. No.: 787,680

[22] Filed: Nov. 4, 1991

[30] Foreign Application Priority Data

| Nov. 7, 1990 | [JP] | Japan | 2-301385 |
| Nov. 7, 1990 | [JP] | Japan | 2-301386 |
| Nov. 30, 1990 | [JP] | Japan | 2-337314 |

[51] Int. Cl.$^5$ ............................................. B23Q 1/18
[52] U.S. Cl. ................................ 29/563; 408/3; 414/225
[58] Field of Search ................ 29/33 P, 563; 408/3, 408/43, 44, 53, 69, 70; 409/158, 163, 174; 414/225, 273, 275

[56] References Cited

U.S. PATENT DOCUMENTS

| 4,545,106 | 10/1985 | Juengel | 29/563 |
| 4,575,290 | 3/1986 | Adair | 409/132 |
| 4,809,425 | 3/1989 | Monforte | 29/563 X |
| 5,100,270 | 3/1992 | Dowdle et al. | 409/132 |

Primary Examiner—Z. R. Bilinsky
Attorney, Agent, or Firm—Burgess, Ryan and Wayne

[57] ABSTRACT

A supply conveyer carries to a supply position a pallet on which process boards and a sacrifice board fitting the process board are stacked, and after a robot positions the sacrifice board at a predetermined position of a suction table, the robot positions the process board on the sacrifice board in order. A numerical control router processes the process boards on the sacrifice board.

16 Claims, 15 Drawing Sheets 5,333,370

AUTOMATIC CONTROL SYSTEM OF A NUMERICAL CONTROL ROUTER

BACKGROUND OF THE INVENTION

The present invention relates to an automatic processing system of a numerical control router for continuously processing wood boards, plywood, resin boards, star wood, light metal and so on.

Generally, a suction table of a numerical control router is composed by metal in midair and the hollow portion of the suction table is passed through a plurality of small holes and is connected to a vacuum pump. When a process board is positioned and processed on such suction table, the process board is not directly positioned because a tool may penetrate the process board and a sacrifice board made of wood having a plurality of small holes corresponding to the holes of the suction table is previously positioned on the suction table and the process board is positioned on the sacrifice board.

However, because the sacrifice boards are promiscuously put near the numerical control router and the sacrifice board corresponding to the process board is sought in the sacrifice boards and set on the suction table of the numerical control router, the productivity of an operator is very low.

SUMMARY OF THE INVENTION

It is, therefore, the primary object of the present invention to provide a labor-saving automatic processing system of a numerical control router by carrying a sacrifice board and process boards with a supply conveyer in order and by processing in the numerical control router.

It is the another object of the present invention to provide a labor-saving automatic processing system of a numerical control router, processing capacity of which is improved by storing sacrifice boards and process board in a board storehouse.

In order to accomplish the above and other objects, the present invention comprises a supply conveyer for carrying to a supply position a pallet on which process boards and a sacrifice board fitting the process boards are stacked, a robot for positioning the sacrifice board at a predetermined position of a suction table and for positioning the process board on the sacrifice board in order, and a numerical control router for processing the process boards on the sacrifice board.

Also, the present invention comprises a board storehouse having shelves for storing a plurality of pallets and a plurality of process boards and a sacrifice board fitting the process boards which are stacked on the pallets, a traverser for carrying the pallets from the shelves to the a supply position, a supply conveyer carrying the pallets from a supply position to a predetermined position, a robot for positioning the sacrifice board on the suction table from the pallet and for positioning the process boards on the sacrifice board from the pallet, and a numerical control router for processing the process boards.

DESCRIPTION OF THE PREFERRED EMBODIMENTS

Figure 1:
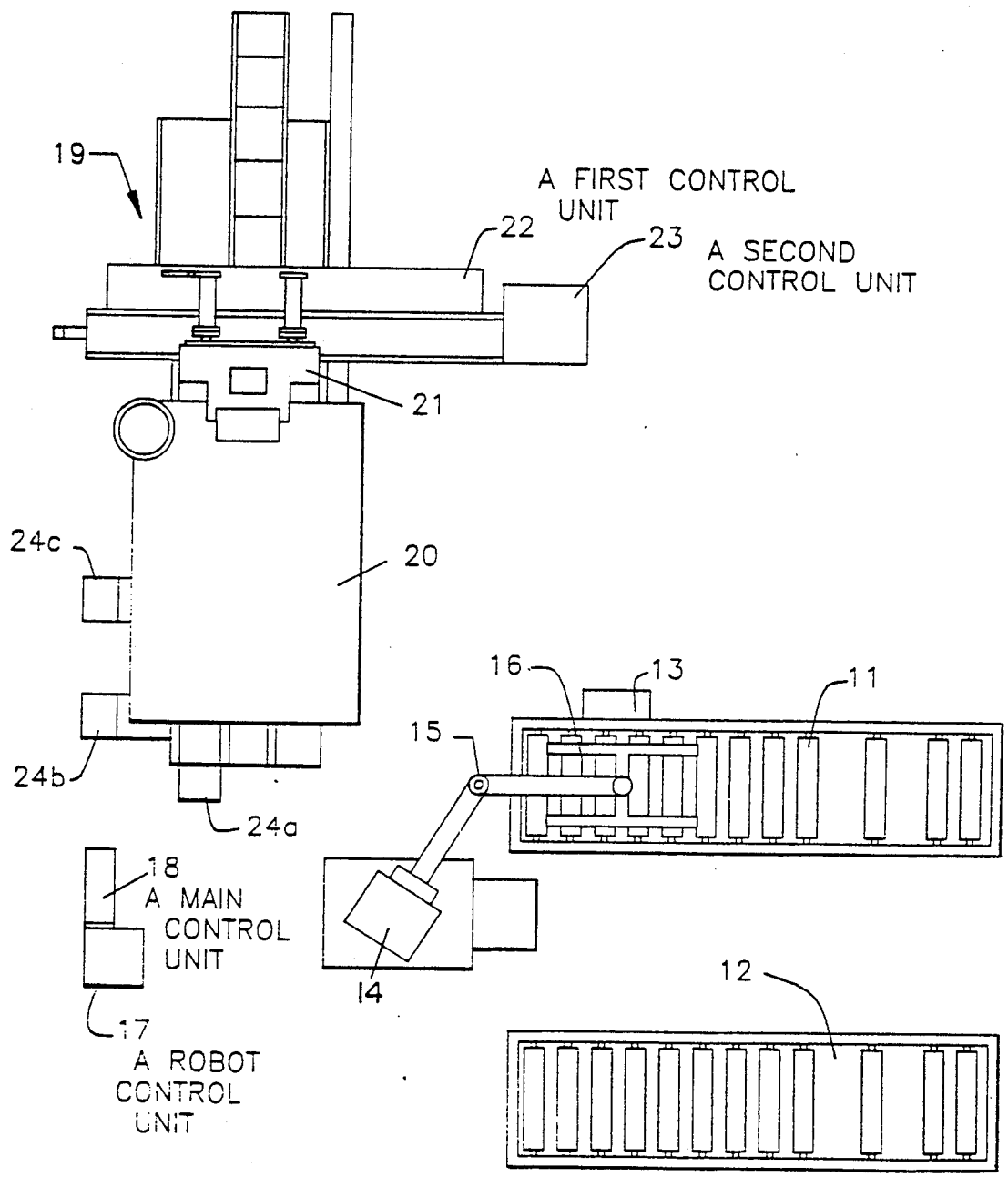
FIG. 1 shows a plane view of a numerical control router system in the embodiment of the present invention.

Referring to FIG. 1, in the numerical control router processing system, a supply conveyer 11 and a discharge conveyer 12 are arranged in a row, and a conveyer control unit 13 for controlling the supply conveyer 11 and the discharge conveyer 12 is arranged in the supply conveyer 11. A robot 14 is arranged near the supply conveyer 11 and discharge conveyer 12 and has a working arm 15 and a suction pad 16 connected to the end portion of the working arm 15. Also, a robot control unit 17 is arranged apart from the working arm 15 of the robot 14 and a main control unit 18 is closely arranged to the robot control unit 17. A suction table 20 of a numerical control router 19 is arranged near the robot 14. First and second control units 22 and 23 are mounted on the numerical control router 19 and rule stoppers 24a, 24b and 24c are attached to a bed portion of the numerical control router 19.

Figure 2:
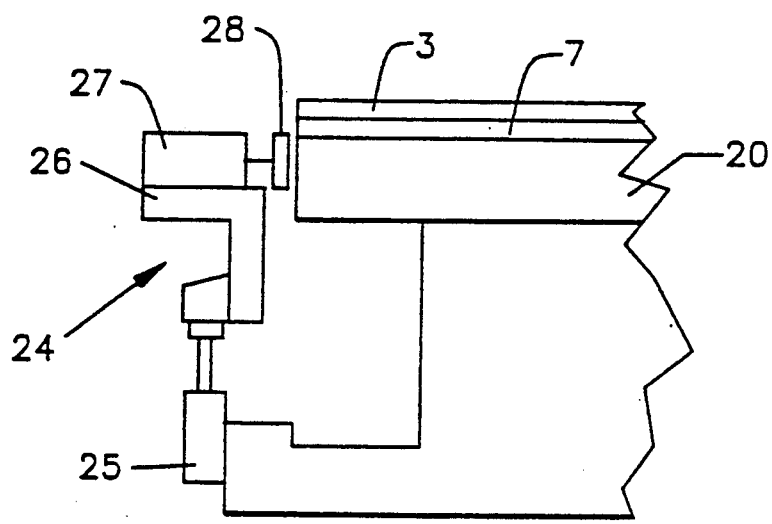
FIG. 2 shows a outline constructed view of a rule stopper in the numerical control router in FIG. 1.
Figures 3A, 3B:
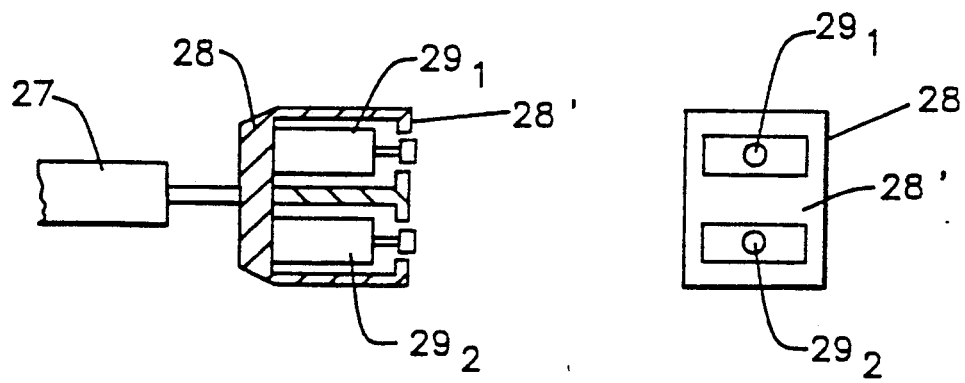
FIGS. 3(a) and 3(b) show a magnified construction view of a rule stopper in the numerical control router in FIG. 2.

Referring to FIGS. 2 and 3, in the rule stoppers 24a, 24b and 24c, an up-down cylinder 25 is attached to the bed portion under the suction table 20. A supporting stage 26 is attached to the working shaft of the up-down cylinder 25 and a cylinder 27 is attached on the supporting stage 26. A detecting portion 28 is attached to the working shaft of the cylinder 27, a contact face portion 28' is accorded to the side face of the suction table 20, and a sensor $29_1$ for detecting the side of the process board 3 and a sensor $29_2$ for detecting the side of the sacrifice board 7 are mounted on the contact face portion portion 28'. As these sensors $29_1$ and $29_2$, limit switches, electromagnetic sensors, light sensors, proximity sensors and so on are used. When the contact face portion 28' of the detecting portion 28 detects the side of the sacrifice board 7 or the process board 3, the sacrifice board 7 and the process board 3 are set on the suction table 20.

Figure 4:
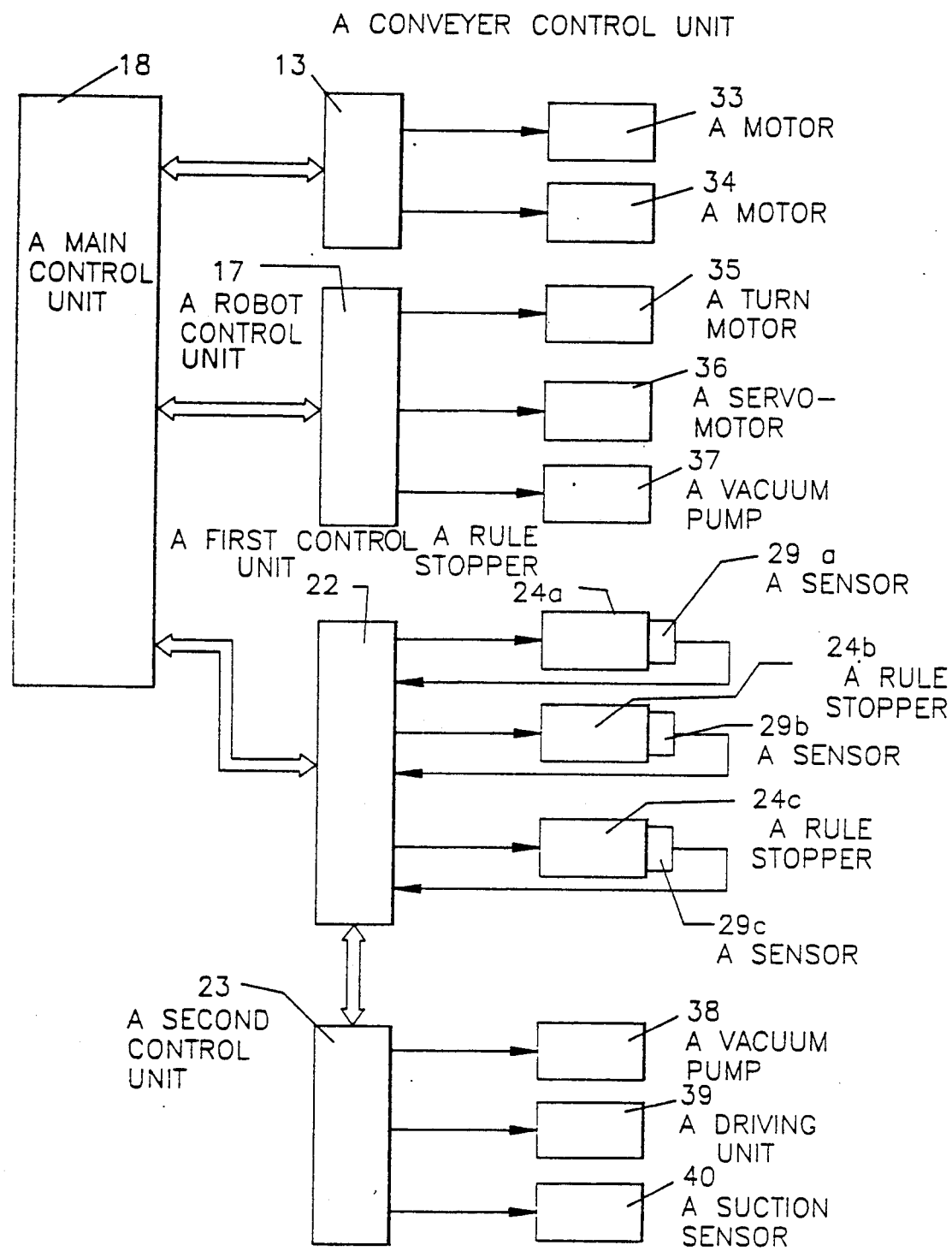
FIG. 4 shows a block diagram of a control unit of the numerical control router in FIG. 1.

Referring to FIG. 4, the conveyer control unit 13 is connected to the main control unit 18 and a motor 33 for driving the supply conveyer 11 and a motor 34 for driving the discharge conveyer 12 are connected to the conveyer control unit 13. Also, the robot control unit 17 is connected to the main control unit 18 and a turn motor 35 for turning the robot 14, a servomotor 36 for driving the working arm 15 and the vacuum pump 37 for drawing the sacrifice board 7 and/or the process board 3 with the suction pad 16 are connected to the robot control unit 17. The first and second control units 22 and 23 are connected to the main control unit 18, the rule stoppers 24a, 24b and 24c are connected to the first control unit 22 and the output terminals of sensors 29a, 29b and 29c are connected to the first control unit 22. A suction pump 38 for drawing the sacrifice board 7 or the process board 3 of the suction table 20, a driving unit 39 for driving the numerical control router 19 and a suction sensor 40 for detecting the suction pressure in the suction table 20 are connected to the control unit 23.

Figure 5:
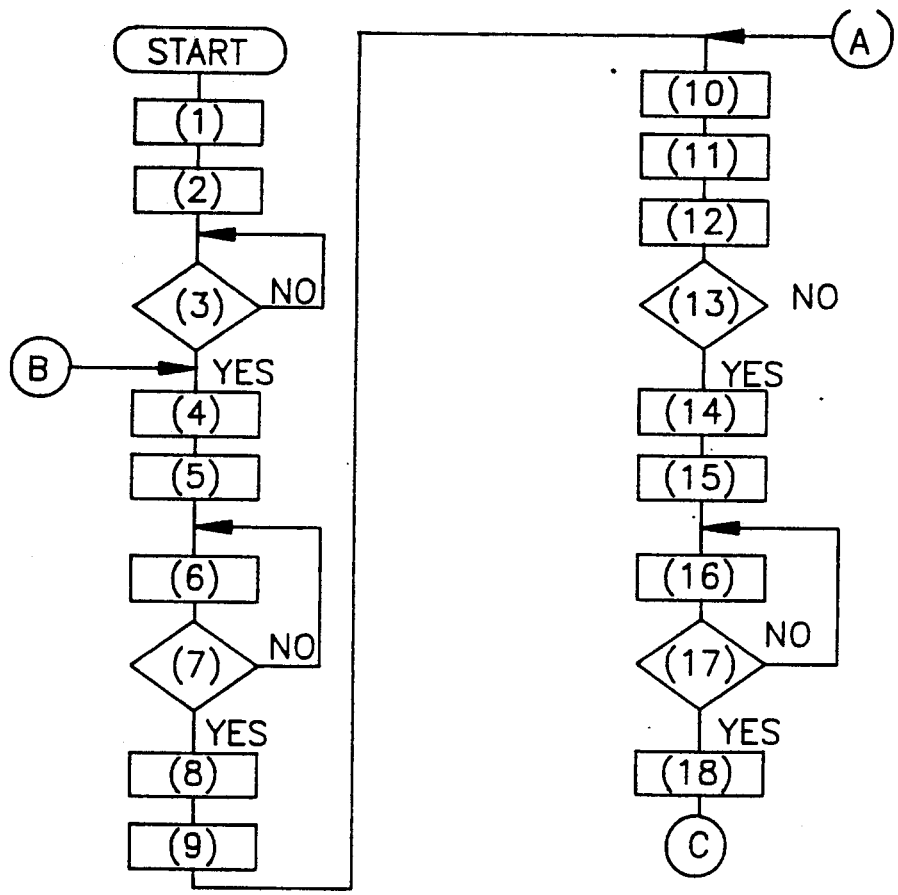
FIG. 5 shows a flow chart for explaining the motion of the numerical control router in FIG. 1.
Figure 6:
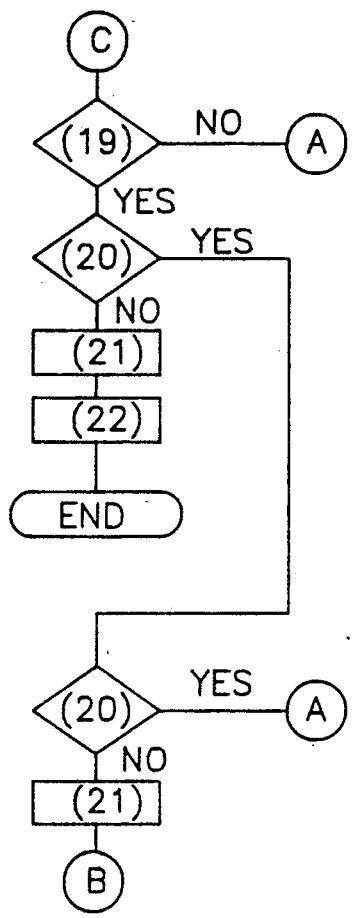
FIG. 6 shows a flow chart for explaining the numerical control router in FIG. 1.

The operation of the embodiment of the numerical control router system is explained in FIGS. 5 and 6 as follows;

(1) When the system is started by turning on the power supply, the numerical control router 19 and the robot 14 are returned to the original point.

(2) The start signals and program signals are transmitted from the main control unit 18 to the robot control unit 17, the conveyer control unit 13 and the numerical control router 19.

(3) Then, the conveyer control unit 13 continues to detect by a detector (not shown) mounted on a predetermined position of the supply conveyer 11 whether a pallet on the which the sacrifice board 7 and the process board 3 are stacked is put on a predetermined position of the supply conveyer 11 or not. The supply conveyer 11 is driven with the motor 33 and when the pallet is put on the supply position of the supply conveyer 11, the pallet is carried to the predetermined position and the supply conveyer 11 is stopped. When the pallet is directly put on the predetermined position, the supply conveyer 11 is stopped.

(4) When the pallet is put on the predetermined position of the supply conveyer 11, the turn motor 35 is driven by the signal from the robot control unit 17 and the robot 14 is turned thereby. Then the working arm 15 is driven with the servomotor 36 and suction pad 16 is moved on the sacrifice board 7. When the suction pad 16 draws the sacrifice board 7 by driving the vacuum pump 37 of the robot 14, the working arm 15 is driven and the sacrifice board 7 is moved on the suction table 20 of the numerical control router 19.

(5) Next, the first control unit 22 drives the cylinders 25 and 27 of the rule stoppers 24a, 24b and 24c and the detecting portions 28 are arranged at predetermined positions of the side of the suction table 20.

(6) The robot 14 moves to contact the sacrifice board 7 drawn by the suction pad 16 to the detecting portions 28 of the rule stoppers 24a, 24b and 24c.

(7) Then the first control unit 22 watches whether all of the sensors 29a, 29b and 29c are turned on with the contact of the sacrifice board 7 or not.

(8) When the sensors 29a, 29b and 29c are turned on, the vacuum pump 38 of the numerical control router 19 is driven, the sacrifice board 7 is drawn on the suction table 20.

(9) After this operation, the rule stoppers 24a, 24b and 24c are returned to the original positions by the cylinders 25 and 27.

(10) Then, the process board 3 is drawn with the suction pad 16 of the robot 14 and is moved on the suction table 20.

(11) The rule stoppers 24a, 24b and 24c are driven in the same operation as (5) and the detecting portions 28 are arranged in the predetermined positions.

(12) The robot 14 is moved to contact the process board 3 drawn by the suction pad 16 to the detecting portion 18 of the rule stoppers 24a, 24b and 24c in the same operation as (6).

(13) Then the first control unit 22 watches whether all of the sensors 29a, 29b and 29c are turned on with the contact of the process board 3 or not.

(14) When the signals are transmitted from the sensors 29a, 29b and 29c, the process board 3 is fixed on the sacrifice board 7 on the table 20 by the suction of the vacuum pump 38 in the numerical control router 19.

The sacrifice board 7 and the process board 3 are drawn on table 20 or on the sacrifice board 7 by the switching of an electromagnetic valve (not shown) connected to a hosepipe of the vacuum pump 38.

(15) After the above operation, the rule stoppers 24a, 24b and 24c are returned to the original positions by the cylinders 25 and 27.

(16) Then the second control unit 23 drives the driving unit 39 by the predetermined program and the process board 3 is processed thereby.

(17) The second control unit 23 watches whether the process of the process board 3 is completed or not.

(18) When the process of the process board 3 is completed, the suction of the process board 3 in the table 20 is stopped, the process board 3 is drawn by the suction pad 16 of the robot 14 and is transmitted on the discharge conveyer 12.

(19) When the process board 3 on the pallet on the supply conveyer 11 is transmitted on the table 20, the robot control unit 17 watches whether the process of all of the process boards 3 on the pallet is completed or not.

(20) If the process of all of the process boards 3 is not completed, the robot 14 is returned to the operation of (10) and the process of the process board 3 is continued. When the process of all of the process boards 3 on the pallet is completed, the main control unit 18 watches by the signals from a switch and so on connected to the conveyer control unit 13 whether the next process of the process board 3 is performed.

(21) When the next process of the process board 3 is not performed, the vacuum pump 38 is stopped, the sacrifice board 7 becomes free on the table 20.

(21) The sacrifice board 7 is moved on the discharge conveyer 12 with the drive of the robot 14 and is transmitted with the process boards 3 to the outside.

(23) When the next process of the process boards 3 on the next pallet is performed in the operation of (20), the main control unit 18 decides with the next process of the process board 3 whether the sacrifice board 7 is used again or not.

(24) When the sacrifice board 7 is not used again, the sacrifice board 7 on the table 20 is moved on the discharge conveyer 12 with the operation of the robot 14. Then returning the operation of (4), after the sacrifice board 7 on the pallet is positioned on the table 20, the process board 3 is processed in the same operation as the above. Also, when the sacrifice board 7 is used again, the program is returned to the operation of (10) and the process board 3 is transmitted from the pallet to the table and is processed with the predetermined process.

In the present embodiment, because the process board 3 is positioned on the sacrifice board 7 after the sacrifice board 7 on the pallet is positioned on the table 20, the process tool is not broken even if a metal table is used. When the kind of process board is changed, because the sacrifice board 7 transmitted with the process boards 3 can be changed simply, working efficiency is improved.

Figure 7:
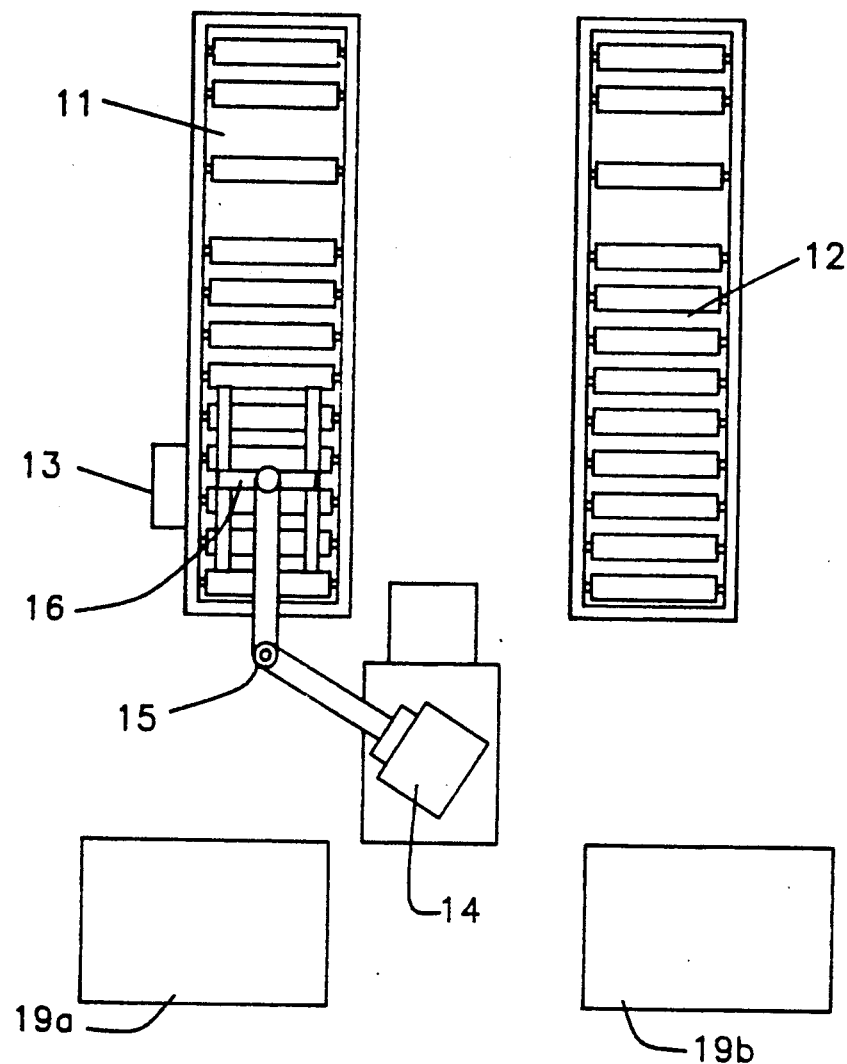
FIG. 7 shows a partial composition of the numerical control router in the other embodiment of the present invention.

Referring to FIG. 7, in the other automatic processing system of the numerical control router, 11 designates a supply conveyer, 12; a discharge conveyer, 13; a conveyer control unit, 14; a robot, 15; a working arm of the robot 14, 16; a suction pad attached to the working arm 15 and these compositions are the same as the above embodiment. A point that the present embodiment is different from the above embodiment is that numerical control routers 19a and 19b are arranged near the robot 14, the sacrifice boards 7 and the process boards 3 carried with the supply conveyer 11 are positioned by the robot 14 on the tables 20 of the numerical control router 19a and 19b in order and the process boards 3, when the process is completed, are carried to the discharge conveyer 12 in order.

In this embodiment, because two numerical control routers 19a and 19b are used, the productive capacity of the automatic control system of the numerical control router improves.

Figure 8:
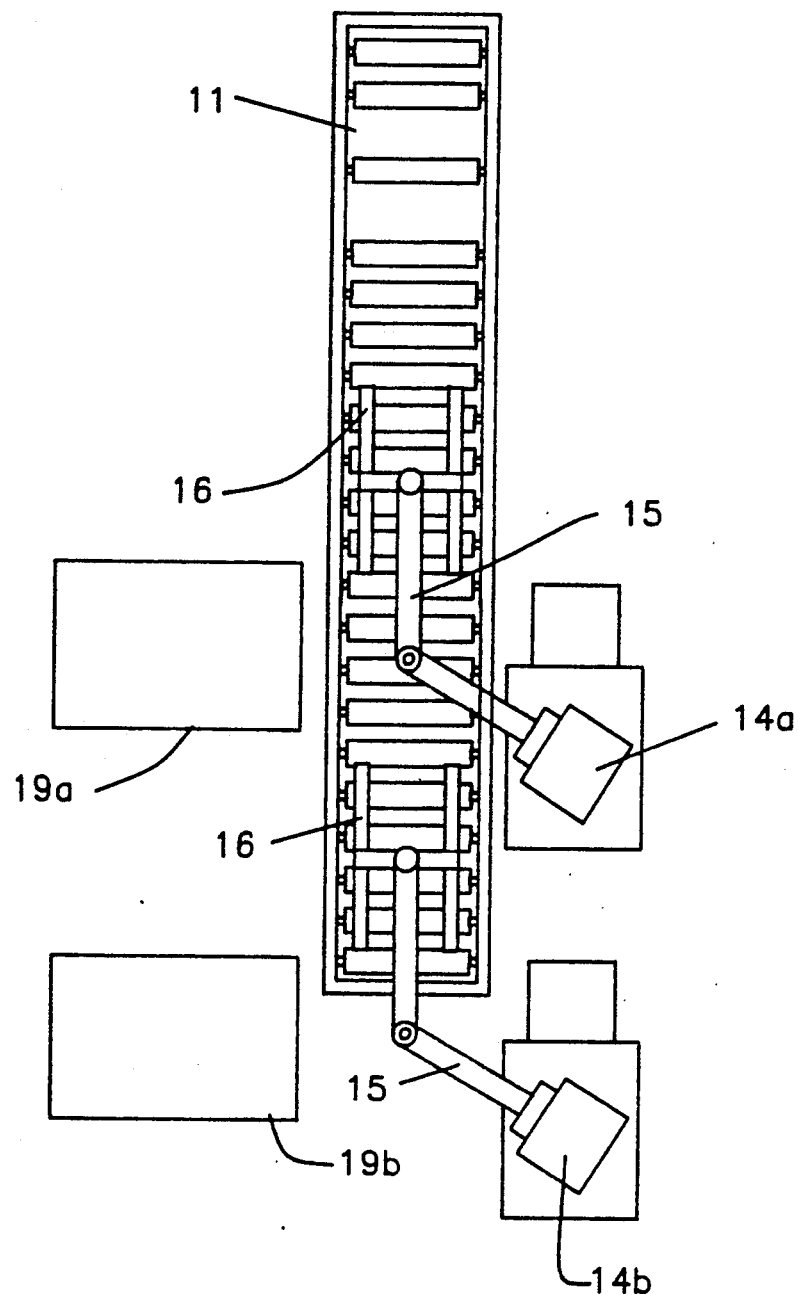
FIG. 8 shows a partial composition of the numerical control router in the further embodiment of the present invention.

Referring to FIG. 8, in the automatic control system of the numerical control router, a long supply conveyer 11 is arranged and the numerical control routers 19a and 19b and the robots 14a and 14b are arranged on both sides of the long supply conveyer 11.

In this embodiment, the pallets are carried on the supply conveyer at a position near the robots 14a and 14b and the sacrifice board 7 and the process boards 3 are positioned on the table 20 of the numerical control routers 19 in order. When the processes of the process boards 3 is complete, the pallets on which the sacrifice boards 7 and the process boards 3 are stacked are carried by the supply conveyer 11. By the present embodiment, the productive capacity of the automatic control system of the numerical control router improves.

The automatic control system in the present invention can arrange two or more numerical control routers.

Figure 9:
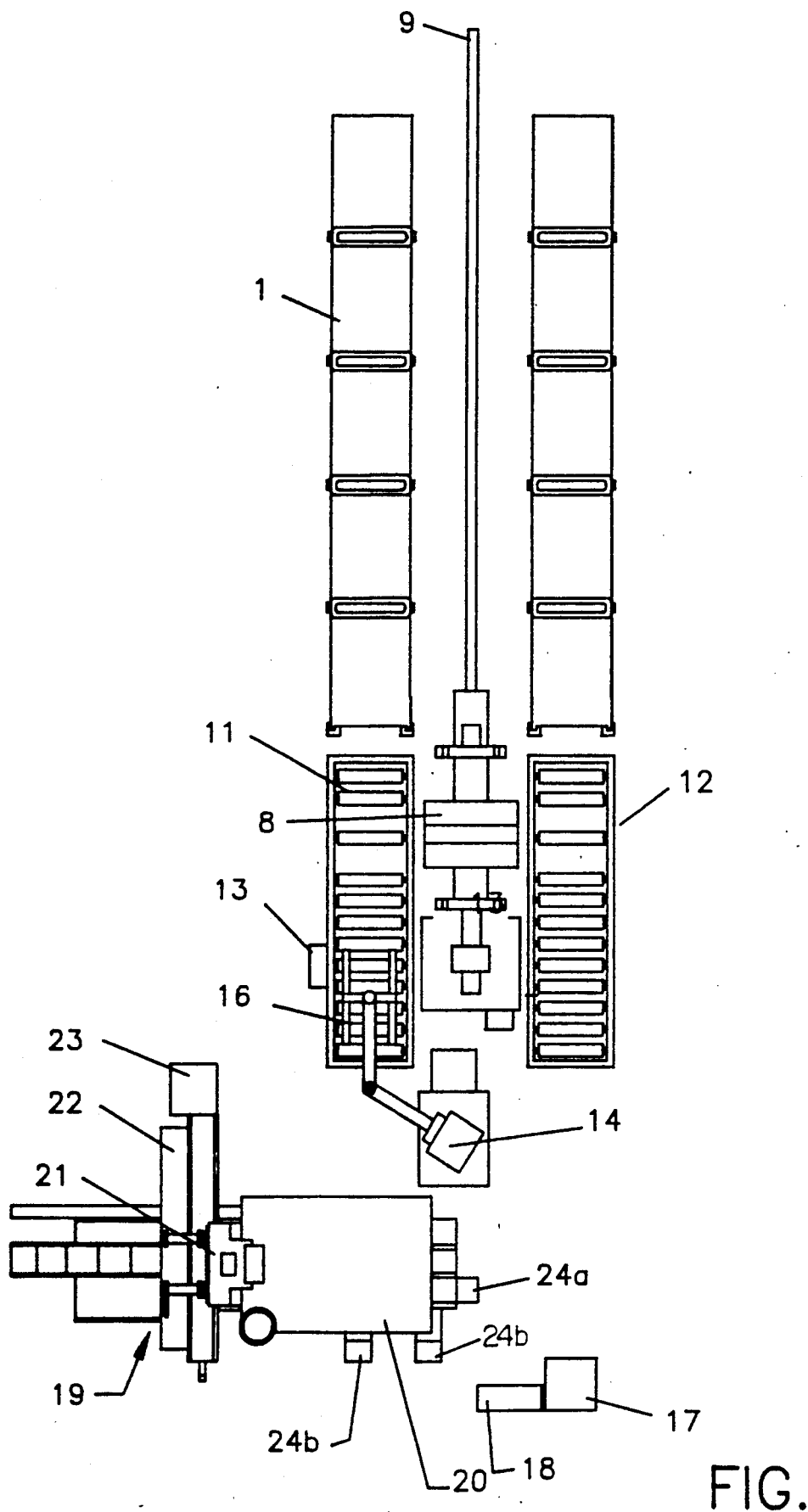
FIG. 9 shows a whole plane view of the automatic processing system of the numerical control router in another embodiment of the present invention.
Figure 10:
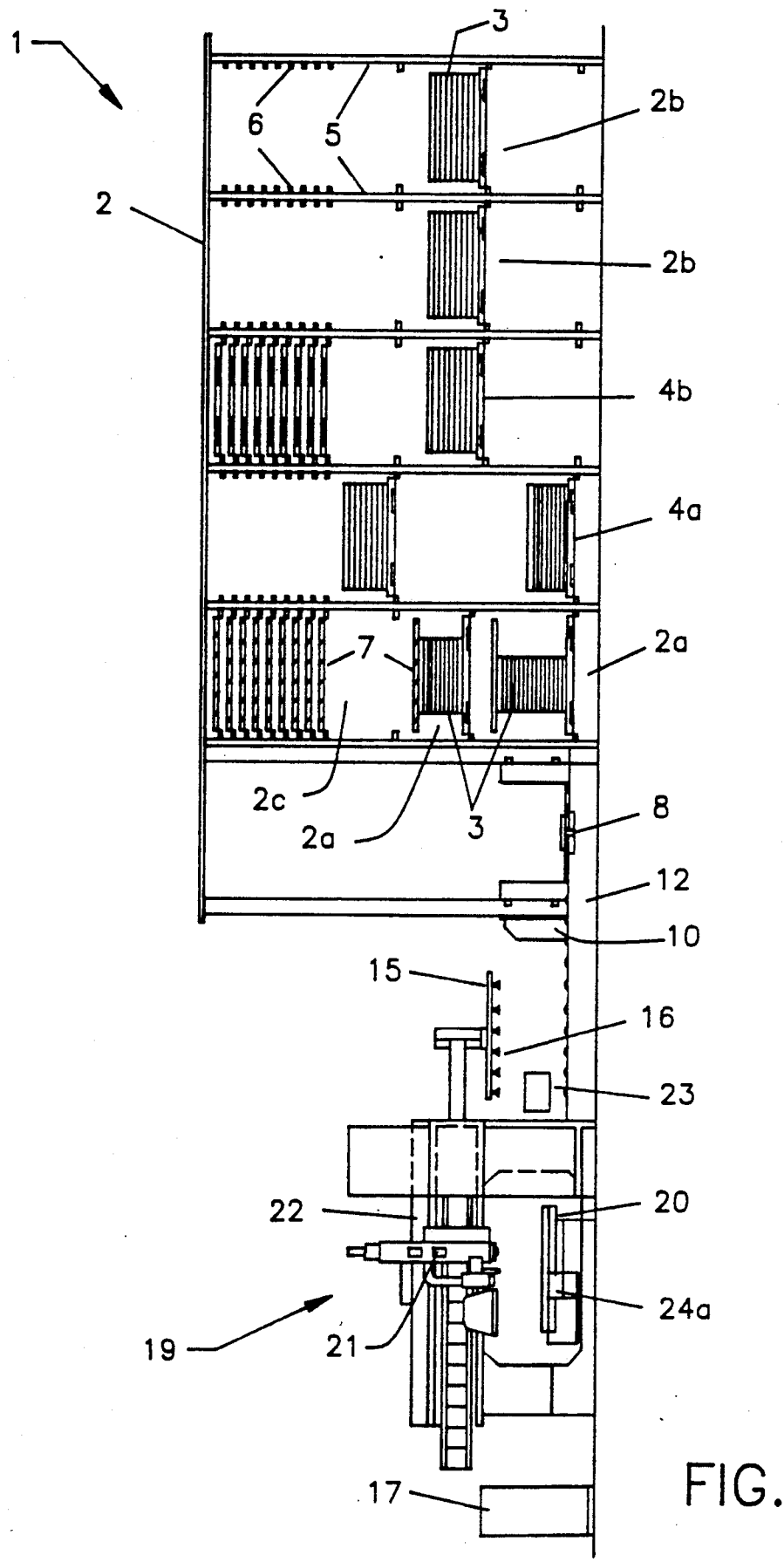
FIG. 10 shows a side view of the automatic processing system of the numerical control router in another embodiment of the present invention.

Referring to FIG. 9 and FIG. 10, in the automatic control system of the numerical control router in the present invention, two racks of shelves 2 are arranged in a board storehouse 1, pallets 4 on which process boards 3 are stacked are put on projecting materials 6 of supports 5, pallets 4 on which process boards 3 and sacrifice boards 7 are stacked are put on the projection materials 6 in the positions 2a of the shelves 2 and pallets 4 on which only the process boards 3 are stacked are put on the projection materials 6 in the positions 2b of the shelves 2. Pallets 4 on which only sacrifice boards 7 are stacked is put on the projection materials 6 in one position 2c of the shelves 2, and only the pallets 4 are put in the position 2d of the shelves 2.

Rails 9 for moving a traverser 8 are arranged between the shelves 2 and a traverser control unit 10 is arranged on the end of the rails 9. A supply conveyer 11 is arranged on one side of the traverser 8, a discharge conveyer 12 is arranged on the other side of the traverser 8 and a conveyer control unit 13 is arranged closely in the supply conveyer 11. A robot 14 is arranged near the traverser control unit 10 and has a working arm 15 and suction pad 16 connected to the working arm 15. A robot control unit 17 is arranged apart from the route of the working arm 15 of the robot 14 and a main control unit 18 is closely arranged in the side of the robot 14. A table 20 of numerical control router 19 is arranged near the robot 14. A first control unit 22 and a second control unit 23 are attached to the numerical control router 19 and rule stoppers 24a, 24b and 24c are attached in the bed portion of the numerical control unit 19.

Figure 11:
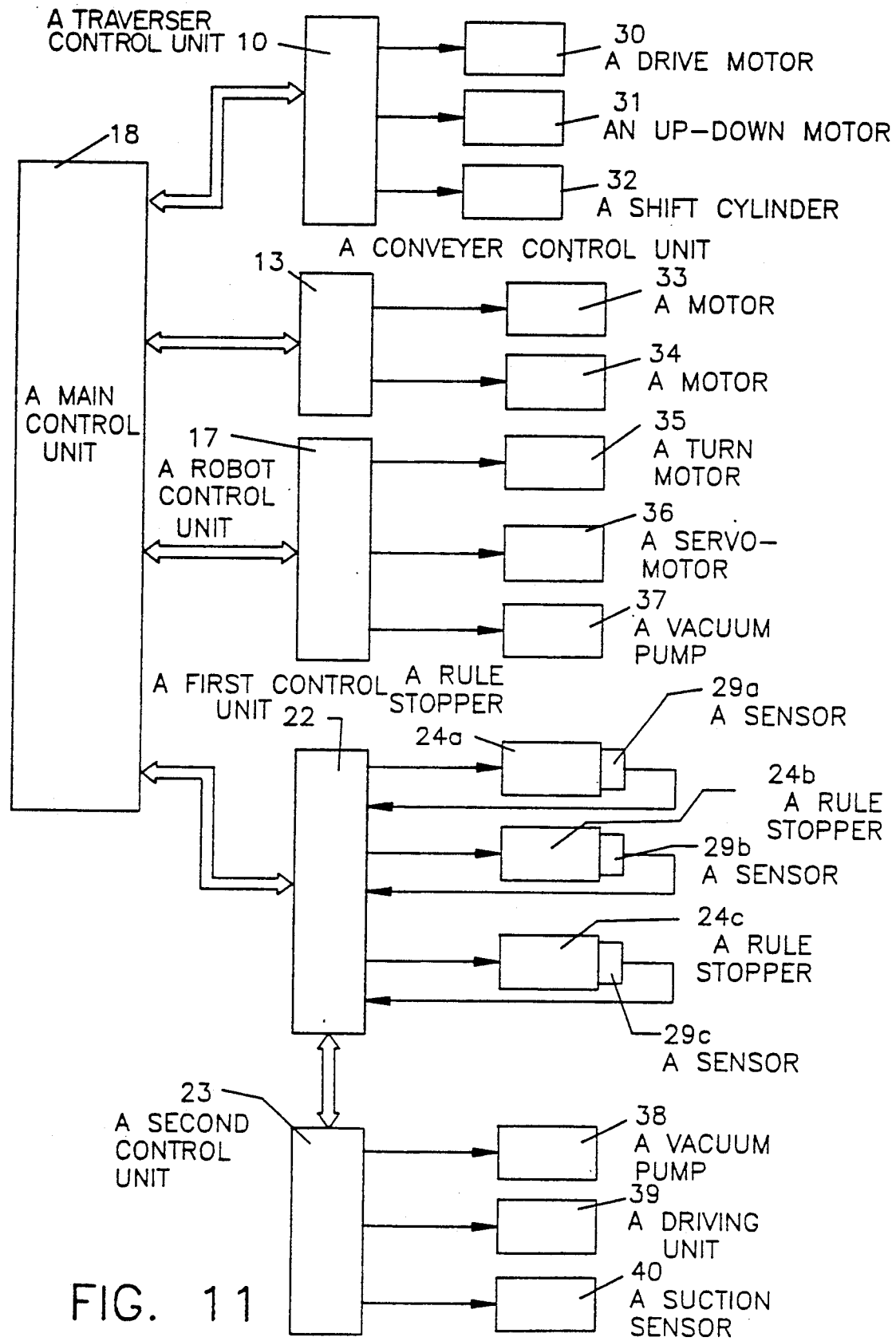
FIG. 11 shows a block diagram of a control unit of the automatic processing system of the numerical control router in FIGS. 9 and 10.

Referring to FIG. 11, the traverser control unit 10 is connected through data buses to the main control unit 18 as shown in FIGS. 9 and 10 and a drive motor 30 driven for the board storehouse 1, the supply conveyer 11 and discharge conveyer 12, an up-down motor 31 and a shift cylinder 32 are connected to the traverser control unit 10. The conveyer control unit 13 is connected to the main control unit 18 and a motor 33 for driving the supply conveyer 11 and a motor 34 for driving the discharge conveyer 12 are connected to the conveyer control unit 13. The robot control unit 17 is connected to the main control unit 18 and a turn motor 35 for turning the robot 14, a servomotor 36 for driving the working arm 15 and a vacuum pump 37 for drawing the sacrifice boards 7 and the process boards 3 are connected to the robot control unit 17. The first and second control units 22 and 23 are connected to the main control unit 18, rule stoppers 24a, 24b and 24c are connected to the first control unit 22 and sensors 29a, 29b and 29c are respectively connected to the rule stoppers 24a, 24b and 24c. A vacuum pump 38 for drawing the sacrifice board 7, the process board 3 on the table 20 and a driving unit 39 for driving the numerical control router 19 and a suction sensor 39 for detecting the suction pressure in the suction table 20 are connected to the second control unit 23.

Figure 12:
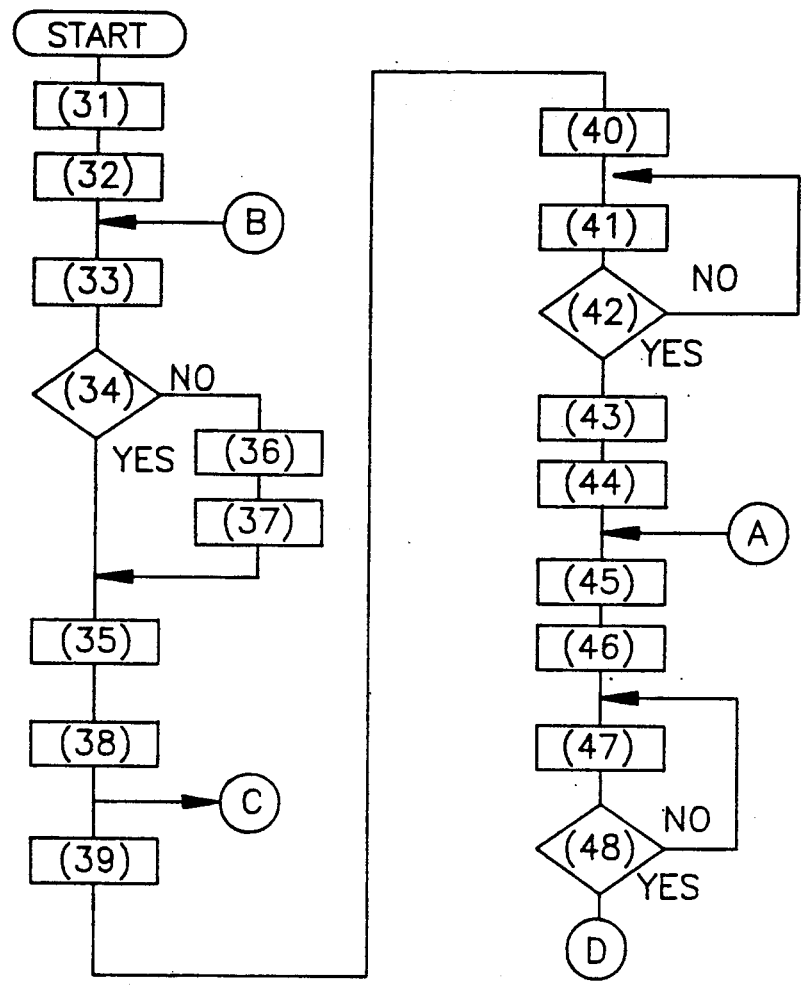
FIG. 12 shows a flow chart for explaining the motion of the automatic processing system of the numerical control router in FIGS. 9 and 10.
Figure 13:
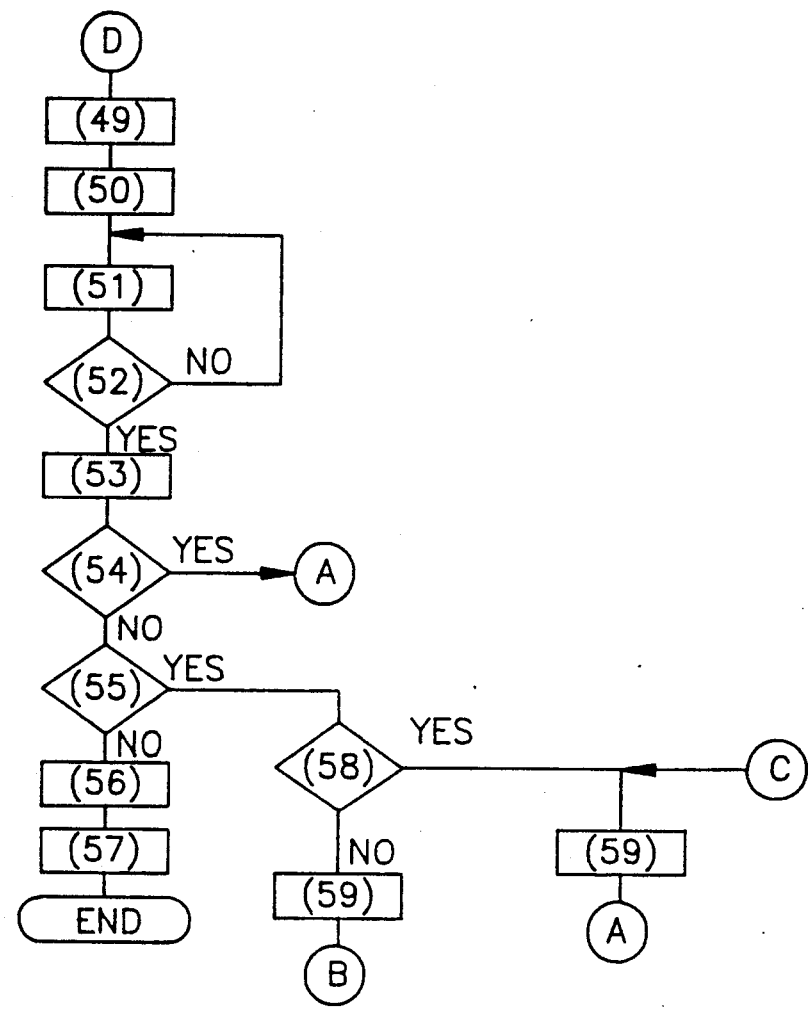
FIG. 13 shows a flow chart for explaining the motion of the automatic processing system of the numerical control router in FIGS. 9 and 10.

The operation of the automatic control system of the numerical control router in the present invention is explained in FIGS. 12 and 13.

(31) When the automatic control system is started by turning on a power supply, the numerical control router 19 and the robot 14 are returned to original points and the traverser 8 is returned to the predetermined position.

(32) Start signals and program signals are transmitted from the main control unit 18 to the traverser control unit 10, the robot control unit 17, the conveyer control unit 13 and the first control units 22.

(33) The traverser control unit 10 drives the driving motor 30, up-down motor 31 and the shift cylinder 32. The traverser 8 is moved to a predetermined position of the shelves 2 and the predetermined pallet 4 is put on the traverser 8.

(34) Then, the traverser control unit 10 decides by the position 4a or 4b to where the traverser 8 is moved and whether the sacrifice board 7 is stacked on the process boards 3 on the pallet 4 or not.

(35) When the sacrifice board 7 is stacked on the process boards 3, the pallet 4 put on the traverser 8 is moved on the supply conveyer 11.

(36) When the sacrifice board 7 is stacked on the process boards 3, the traverser 8 is moved to the position to where only the sacrifice boards 7 are.

(37) Then, the sacrifice board 7 is stacked on the process board 3 by raising the pallet 4 and the process boards 3 and the pallet 4 is moved on the supply conveyer 11 with the traverser 8.

(38) The motor 33 of the supply conveyer 11 is driven and the pallet 4 is transmitted to the predetermined position.

(39) When the pallet 4 is moved to the predetermined position, the robot control unit 17 drives the turn motor 35 of the robot 14, thereby the working arm 15 is turned and is operated by the servomotor 36 and the suction pad 16 is moved on the sacrifice board 7. Also, the suction pad 16 draws the sacrifice board 7 by driving the vacuum pump 37 of the robot 14, the working arm 15 is driven and the sacrifice board 7 is transmitted on the table 20.

(40) The first control unit 22 drives the cylinders 25 and 27 to arrange the detecting portion 28 of the rule stoppers 24 to the predetermined position in the side of the bed of the numerical control router 19.

(41) The robot 14 moves the sacrifice board 7 drawn with the suction pad 16 to contact the contact portion 28' of the detecting portion 28 of the rule stoppers 24a, 24b and 24c.

(42) The first control unit 22 watches whether all of the sensors 29a, 29b and 29c are turned on or not.

(43) When the sensors 29a, 29b and 29c detect sacrifice board 7, the sacrifice board 7 is drawn on the table 20 by the suction operation of the vacuum pump 38.

(44) After this operation, the rule stoppers 24a, 24b and 24c are returned to the original positions with the cylinders 25 and 27.

(45) The robot 14 draws the process board 3 on the pallet 4 with the suction pad 16 and moves the process board 3 on the table 20.

(46) The rule stoppers 24a, 24b and 24c are moved to the predetermined positions in the same operation as

(40) and the detecting portions 28 of the rule stoppers 24a, 24b and 24c.

(47) The robot 14 moves the process board 3 to contact the detecting portions 28 of the rule stoppers 24a, 24b and 24c in the same operation as (41).

(48) The first control unit 22 watches whether all of the sensors 29a, 29b and 29c are turned on or not.

(49) When the sensors 29a, 29b and 29c are turned on, the process board 3 is drawn on the table 20 by driving the vacuum pump 38 of the numerical control router 19.

(50) The suction of the sacrifice board 7 and the process board 3 is performed by switching the electromagnetic valve (not shown). After this operation, the rule stoppers 24a, 24b and 24c are returned to the original positions with the cylinders 25 and 27.

(51) The second control unit 23 drives the driver unit 39 of the numerical control router 19 and the process board 3 is processed according to the predetermined program.

(52) Then, the second control unit 23 watches whether the process of the process board 3 is completed or not.

(53) When the process of the process board 3 is completed, the suction of the process board 3 is stopped on the table 20, the process board 3 is drawn by the suction pad 16 and the robot 14 transmits the process board 3 on the discharge conveyer 12.

(54) This operation is returned to the operation of (45) whenever the process of one process board 3 is completed.

(55) When the process of all of the process boards 3 on the pallet 4 is completed, the second control router 23 watches by the signals from the main control unit 18 whether the next process boards 3 are transmitted to the supply conveyer 11 or not.

(56) When the next process boards 3 are not transmitted on the supply conveyer 11, the vacuum pump 38 of the table 20 is stopped.

(57) The robot 14 moves the sacrifice board 7 on the discharge conveyer 12.

After this operation, the sacrifice board 7 is discharged with the process boards 3 on the pallet 4 to the outside of the board storehouse 1.

(58) When the next process of the process boards 3 on the pallet 4 is performed, the second control unit watches according to the signals from the main control unit whether the sacrifice board 7 fixed on the table 20 is used again or as other sacrifice board 7 is used.

(59) When the sacrifice board 7 is not used again, the vacuum pump 38 is stopped and the robot 14 moves the sacrifice board 7 on the table 20 to the discharge conveyer 12.

Then the operation is returned to the operation of (33), the pallet 4 on which the sacrifice board and the process boards 3 are stacked is transmitted from the shelves 2 to the supply conveyer 11, the sacrifice board 7 is positioned from pallet 4 to the table 20 and the process board 3 is processed after the process board 3 is positioned on the sacrifice board 7 on the table 20 in order.

(60) When the sacrifice board 7 is used in the operation of (38), because the pallet 4 on which the sacrifice board 7 and the process boards 3 are stacked is transmitted with the supply conveyer 11, the sacrifice board 7 is directly moved to the discharge conveyer 12 and this operation is shifted to the operation of (45).

In the this embodiment, when the sacrifice board 7 is set on the table 20, the pallet 4 on which the sacrifice board 7 and the process boards 3 are stacked is transmitted to the supply conveyer 11 by the traverser 8. Instead of this, the pallet 4 on which only the process boards 3 are stacked may be selected in the shelves 2 or the pallet 4 from which the sacrifice board 7 is removed may be transmitted with the traverser 8. Also, the pallet 4 on which only the sacrifice board 7 is transmitted with the traverser 8 and supply conveyer 11 and after this, pallet 4 on which only the process boards 3 may be transmitted.

In this embodiment, when the sacrifice board 7 which is previously positioned is used again, because the sacrifice board 7 can be removed from the pallet 4 in the next process of the process boards 3, the time for positioning the sacrifice board 7 becomes short.

Figure 14:
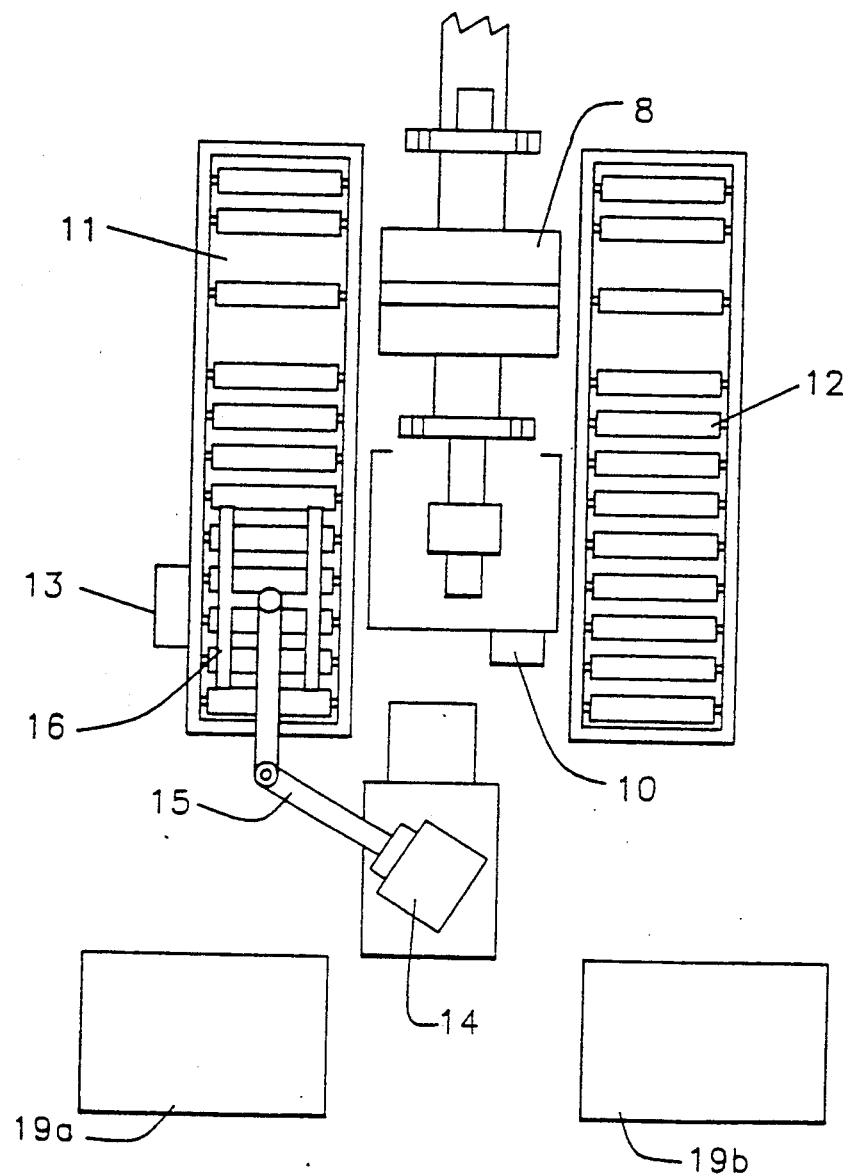
FIG. 14 shows a partial composition of the automatic processing system of the numerical control router in the other embodiment of the present invention.

Referring to FIG. 14, in the automatic control system of the numerical control router of the other embodiment in the present invention, 8 designates a traverser, 10; a traverser control unit, 11; a supply conveyer, 12; a discharge conveyer, 13; a conveyer control unit, 14; a robot, 15; a working arm and 16; suction pad, these compositions are the same as the above embodiments and the explanation of these compositions is omitted. In this embodiment, numerical control routers 19a and 19b are arranged near the robot 14, the sacrifice boards 7 and the process boards 3 which are carried with the supply conveyer 14 are set with the robot 14 in order and the process board, 3 the process of which is performed, are moved with the robot 14 to the discharge conveyer 12.

In this embodiment, the product capacity in this system in improved.

Figure 15:
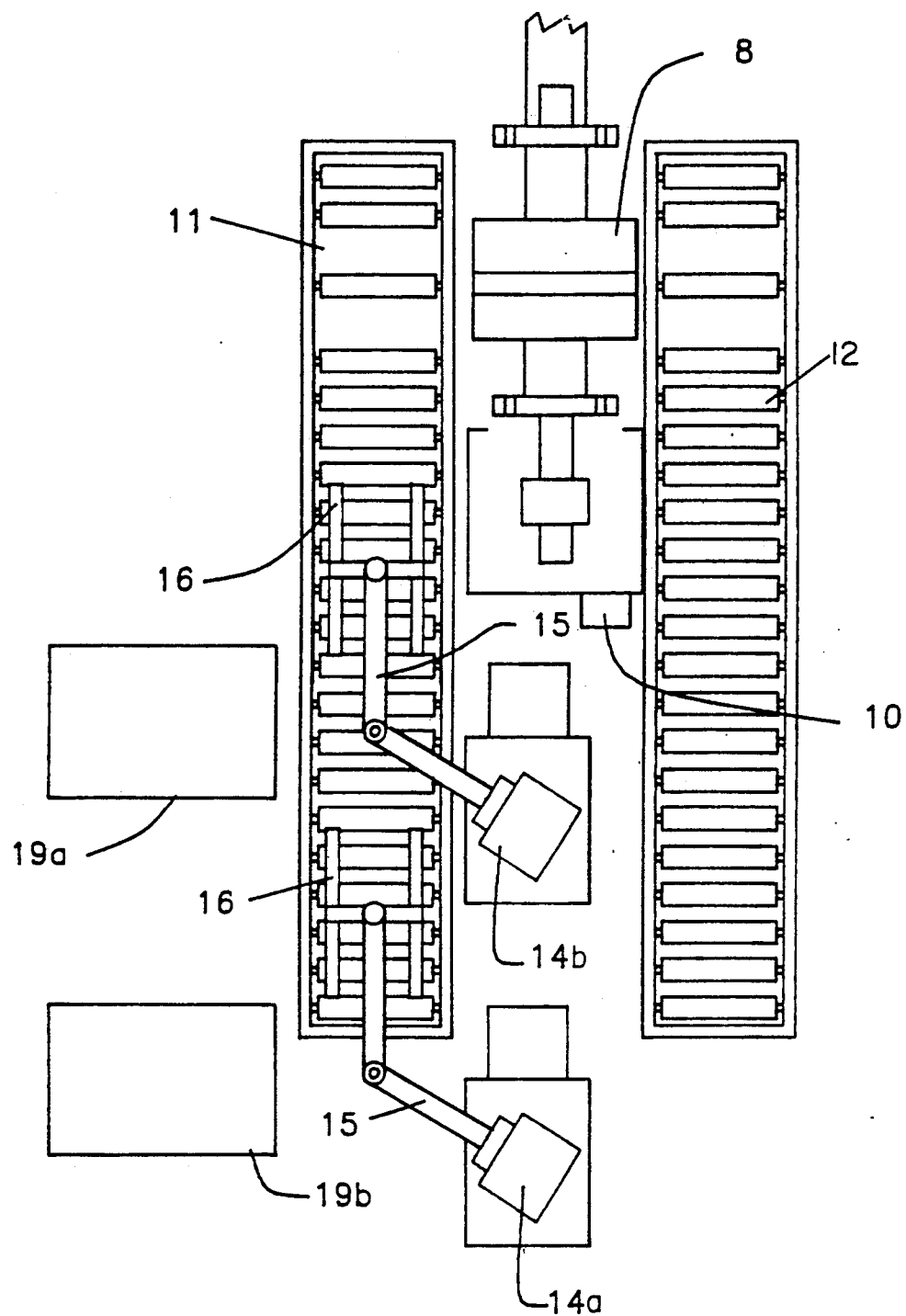
FIG. 15 shows a partial composition of the automatic processing system of the numerical control router in the further embodiment of the present invention.

Referring to FIG. 15, in the automatic control system of the numerical control router of the other embodiment in the present invention, 8 designates a traverser, 10; a traverser control unit, 11; a supply conveyer, 12; a discharge conveyer, 14a and 14b; robots, 15; a working arm and 16; suction pad, 19a and 19b; numerical control routers, these compositions are the same as the above embodiments and the explanation of these compositions is omitted. In this embodiment, the supply conveyer 11 and the discharge conveyer 12 are made long, the two numerical control routers 19a and 19b and the two robots 14a and 14b are arranged near the ends of the supply and discharge conveyers 11 and 12.

In this embodiment, the pallets 4 transmitted on the supply conveyer 11 are respectively carried to predetermined positions near the robots 14 and the sacrifice board 7 and the process boards 3 are positioned in order. When the process of the process board 3 is completed, the respective robots 14a and 14b move the process boards 3 or the sacrifice boards 7 to the discharge conveyer 12.

In this embodiment, the product capacity in this system is improved.

In this embodiment, the numerical control routers 19 can be three or more.

Figure 16:
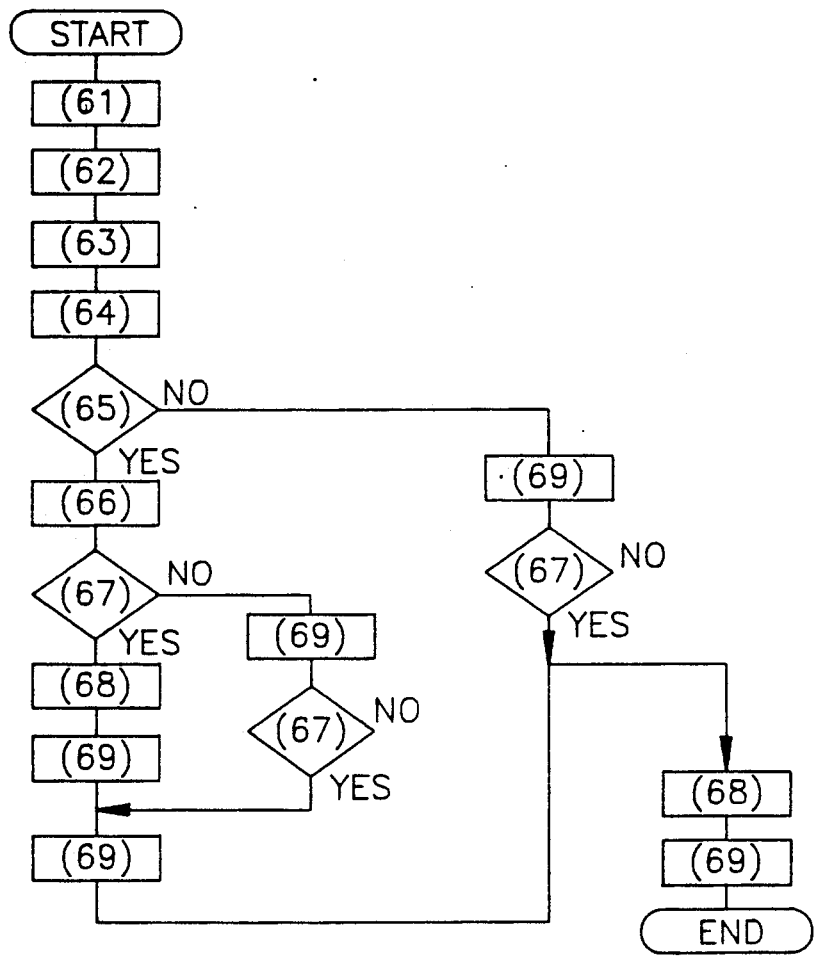
FIG. 16 shows a flow chart for explaining the motion of the automatic processing system of the numerical control router in FIG. 1.

In FIGS. 4 and 11, the other embodiment is explained in a flow chart of FIG. 16. When the supply power is turned on, the robot 14 is returned to the original position, the start signals and the program signals are transmitted from the main control unit 18 to the robot control unit 17, the conveyer control unit 13 and the first and second control units 22 and 23. Then the pallet 4 on which the sacrifice board 7 and the process board are stacked is set on the supply position of the supply conveyer 11, the supply conveyer 11 is driven with motor 34 and the pallet 4 is carried to the predetermined position of the supply conveyer 11. In this case, when the pallet 4 is directly put on the predetermined position of the supply conveyer 11, the motor 34 is not driven.

(61) The motor control unit 17 drives the turn motor 35 to turn the robot 14 and the working arm 15 is driven with the servomotor 36.

(62) The suction pad 16 of the robot 14 is moved on the sacrifice board 7 and the process board 3, the vacuum pump is driven and the sacrifice board 7 or the process board 3 is drawn with the suction pad 16.

(63) Then the first control unit 22 drives the numerical control unit.

(64) The working arm 15 is driven and the sacrifice board 7 or the process board 3 is moved on the table 20.

(65) The first control unit 22 drives the up-down cylinder 25 and cylinder 27 and the rule stoppers 24a, 24b and 24c are set at predetermined positions at the side of the table 20. The robot 14 moves the sacrifice board 7 or the process board 3 to the contact portions 28' of the detecting portion 28 in the rule stoppers 24a, 24b and 24c. The first control unit 22 watches whether all of the sensors 29a, 29b and 29c of the rule stoppers 24a, 24b and 24c are turned on or not.

(66) When the sensors 29a, 29b and 29c are turned on, the first control unit 23 drives the vacuum pump 38 of the table.

(67) A suction sensor 40 attached to the table 20 watches whether the suction pressure in the table 20 is set to the predetermined value or not.

(68) When the suction pressure in the table 20 is set to the predetermined value, the second control unit 23 decides that the sacrifice board 7 or the process board 3 is drawn on the table 20. After this, the rule stoppers 24a, 24b and 24c are returned to the predetermined positions with up-down cylinder 25 and the cylinder 27.

(69) The first control unit 22 drives the drive unit 39 by the predetermined program and the process board 3 is processed.

(70) When the process of the process board 3 is completed, the drawing operation on the table 20 is completed.

(71) The sacrifice board 7 or the process board is drawn by the suction pad 16 of the robot 14 and is transmitted on the discharge conveyer 12.

(72) The robot 14 is returned to the original position.

In such operation, when the sacrifice board 7 or the process board 3 is flat and is put on the predetermined position of the supply conveyer 11, the sacrifice board 7 or the process board 3 is correctly set on the table 20. However, when the sacrifice board 7 or the process board 3 curves or is not set on the predetermined of the table 20, even if the sacrifice board 7 or the process board 3 is set on the table 20 with the robot 14, the sacrifice board 7 or the process board 3 may not be contacted with the three rule stoppers 24a, 24b and 24c and may be detected with the sensors 29a, 29b and 29c.

(73) In this case, the first control unit 22 sets its timer in the predetermined time. (74) Then the first control unit 22 watches whether all of the sensors 29a, 29b and 29c are turned on in the predetermined time or hot.

When the sensors 29a, 29b and 29c are not turned on in the predetermined time, the operation is shifted to the operation of (71) and the robot 14 is driven and the sacrifice board 7 or the process board 3 is transmitted to the discharge conveyer 12.

Also, in the operation of (65), when the sacrifice board 7 or the process board 3 is in contact with all of the sensors 29a, 29b and 29c of the rule stoppers 24a, 24b and 24c and the second control unit 23 drives the vacuum pump 37 of the table 20 in the operation of (65), the sensor 40 watches whether the suction pressure in the table 20 is set to a predetermined value or not in the operation of (67). Then, in the case where the sacrifice board 7 or the process board 3 curves, the air in the table 20 leaks. In such case, there are cases where the sacrifice board 7 or the process board 3 is drawn on the table by mere chance.

(75) Therefore, the first control unit 22 drives the inner timer.

(76) Then the first control unit 22 watches whether the predetermined time is completed or not.

If the sacrifice board 7 or the process board 3 is not drawn in the predetermined time, the operation is shifted to (70), the suction operation in the table 20 is stopped and the sacrifice board 7 or the process board 3 is moved to the predetermined position on the discharge conveyer 12 by driving the robot 14.

In the present embodiment, the system can prevent the stop condition that the numerical control router 19 is not driven because the sacrifice board 7 or the process board 3 is not positioned or is drawn on the table 20.

Therefore, the process of the process board 3 is continuously performed without watch of men.

What is claimed is:

1. An automatic processing system of a numerical control router comprising:
   a suction table having at least two sides;
   a rule stopper provided at each of at least two sides of the suction table;
   moving means for moving each said rule stopper, said moving means including first cylinder means for moving each said rule stopper in a first direction up and down relative to said suction table and second cylinder means for moving each said rule stopper inwardly toward and outwardly away from said suction table, each said second cylinder means including a driving shaft movable toward and away from said suction table, and each said rule stopper is mounted to one said driving shaft;
   supply conveyor means for carrying a pallet on which a process board and a sacrifice board fitting a process board are stacked, to a supply position;
   robot means for:
      removing the sacrifice board from the supply conveyor means,
      pressing the sacrifice board against the rule stoppers by means of an arm of the robot means so as to position the sacrifice board on the suction table,
      subsequently removing the process board from the supply conveyor means, and
      pressing the arm of the robot means against the rule stoppers so as to position the process board on the sacrifice board; and
   numerical control router means for automatically processing the process board on the sacrifice board when the sacrifice board is on the suction table.

2. The automatic processing system of claim 1, wherein after processing of the process boards stacked on the pallet in the supply position is completed, the robot means removes the sacrifice board from the table.

3. The automatic processing system of claim 1, further comprising at least two numerical control routers arranged to operate cooperatively with the robot means.

4. The automatic processing system of claim 1, further comprising at least two control routers and robot means are arranged to operate cooperatively.

5. The automatic processing system of claim 1 further comprising three sensor means for detecting the position of the sacrifice board on the suction table and control means for removing the sacrifice board from the suction table when the position of the sacrifice board is not detected by the three sensor means in a predetermined time.

6. The automatic processing system of claim 5 further comprising three sensor means for detecting the position of the process board on the suction table and control means for removing the process board from the suction table when the position of the process board is not detected by the three sensor means in a predetermined time.

7. The automatic processing system of claim 1 comprising sensor means for detecting the position of the sacrifice board on the suction table, suction pressure sensing means for detecting a suction pressure of the suction table and control means for removing the sacrifice board from the suction table if the suction pressure sensing means does not detect a suction pressure in a predetermined range when the sacrifice board is in the predetermined position.

8. The automatic processing system of claim 1 comprising sensor means for detecting the position of the process board on the suction table, suction pressure sensor means for detecting a suction pressure of the suction table and control means for removing the process board from the suction table without processing if the suction pressure sensor means does not detect a suction pressure in a predetermined range when the process board is in the predetermined position.

9. An automatic processing system of a numerical control router comprising:
   a board storehouse having shelves for storing a plurality of pallets and a plurality of process boards and a sacrifice board fitting the process boards which are stacked on the pallets;
   traverser means for carrying the pallets from the shelves to a supply position;
   a suction table having at least two sides;
   a rule stopper provided at each of at least two sides of the suction table;
   moving means for moving each said rule stopper, said moving means includes first cylinder means for moving each said rule stopper in a first direction up and down relative to said suction table and second cylinder means for moving each said rule stopper inwardly toward and outwardly away from said suction table, each said second cylinder means including a driving shaft movable toward and away from said suction table, and each said rule stopper is mounted to one said driving shaft;
   supply conveyer means for carrying one said pallet from the supply position to a predetermined position;
   robot means for:
      positioning one said sacrifice board which is on the pallet at the predetermined position on said suction table by pressing the sacrifice board against the rule stoppers by means of an arm of the robot means; and
      positioning the process boards which are on the pallet at the predetermined position on the sacrifice board which is on the suction table by pressing the arm of the robot means against the rule stoppers; and
   numerical control router means for processing the process boards on the suction table.

10. The processing system of claim 9 further comprising control means for removing the sacrifice board from the suction table after a last process board on the pallet has been removed from the suction table.

11. The processing system of claim 9, further comprising:
   traverser control means for controlling the movement of a traverser,
   supply conveyor control means for controlling the drive of the supply conveyor means,
   robot control means for controlling the operation of the robot means, and
   main control means for supplying command signals to drive said traverser control means, said supply conveyer control means and said robot control means.

12. The processing system of claim 9, further comprising at least two numerical control routers and robot means arranged to operate cooperatively with the supply conveyer means.

13. The automatic processing system of claim 9, further comprising three sensor means for detecting the position of the sacrifice board on the suction table, and means for removing the sacrifice board from the suction table if the sacrifice board in the predetermined position is not detected by the three sensor means in a predetermined time.

14. The processing system of claim 9, further comprising three sensor means for detecting the position of the process board and the suction table and means for removing the process board without processing from the suction table if the process board in the predetermined position is not detected by the three sensor means in a predetermined time.

15. The system of claim 9, further comprising sensor means for detecting the position of the sacrifice board on the suction table, suction pressure sensing means for detecting a suction pressure of the suction table and control means for removing the sacrifice board from the suction table when the suction pressure sensing means does not detect a suction pressure in a predetermined range when the sacrifice board is in the predetermined position.

16. The processing system of claim 9, further comprising sensor means for detecting the position of the process board in relation to the suction table, suction pressure sensing means for detecting a suction pressure of the suction table and control means for removing the process board from the suction table without processing when the suction pressure sensor means does not detect a suction pressure in a predetermined range when the process board is in the predetermined position.

* * * * *